(12) United States Patent
Farrell et al.

(10) Patent No.: US 10,186,120 B2
(45) Date of Patent: Jan. 22, 2019

(54) REMOTE MONITORING SYSTEM

(71) Applicant: Station Innovation Pty Ltd, Brisbane (AU)

(72) Inventors: Mike Farrell, Brisbane (AU); Chris Glanville, Brisbane (AU); Harvey Conroy, Brisbane (AU); Kelly Farrell, Brisbane (AU)

(73) Assignee: Station Innovation Pty Ltd, Brisbane (AU)

( * ) Notice: Subject to any disclaimer, the term of this patent is extended or adjusted under 35 U.S.C. 154(b) by 0 days.

(21) Appl. No.: 15/527,682

(22) PCT Filed: Nov. 18, 2015

(86) PCT No.: PCT/AU2015/050725
§ 371 (c)(1),
(2) Date: May 17, 2017

(87) PCT Pub. No.: WO2016/077883
PCT Pub. Date: May 26, 2016

(65) Prior Publication Data
US 2017/0345282 A1    Nov. 30, 2017

(30) Foreign Application Priority Data
Nov. 18, 2014    (AU) ................................ 2014904629

(51) Int. Cl.
| | | |
|---|---|---|
| *G08B 1/08* | (2006.01) |
| *G08B 5/36* | (2006.01) |
| *G08B 25/00* | (2006.01) |
| *G08B 25/01* | (2006.01) |
| *G08B 25/08* | (2006.01) |

(Continued)

(52) U.S. Cl.
CPC ................. *G08B 1/08* (2013.01); *G08B 5/36* (2013.01); *G08B 13/149* (2013.01); *G08B 21/20* (2013.01); *G08B 25/009* (2013.01); *G08B 25/014* (2013.01); *G08B 25/08* (2013.01);
(Continued)

(58) Field of Classification Search
CPC . G08B 1/00; G08B 1/08; G08B 17/00; G08B 17/02; G08B 17/005; G01N 35/00; G01N 35/00871; G01N 35/0584; G01N 35/0712; G01N 2035/0081; G01N 2035/00891; G06F 2219/00; G06F 2019/10; A61B 5/02; A61B 5/743; A61B 5/746; A61B 5/0002; A61B 5/0024; A61B 5/7435

See application file for complete search history.

(56) References Cited

U.S. PATENT DOCUMENTS

| | | |
|---|---|---|
| 6,023,223 A | 2/2000 | Baxter, Jr. |
| 7,295,919 B2 | 11/2007 | Humphrey |

(Continued)

FOREIGN PATENT DOCUMENTS

WO        WO        2/2016
    PCT/AU2015/050725

*Primary Examiner* — Van T Trieu
(74) *Attorney, Agent, or Firm* — Wells St. John P.S.

(57) ABSTRACT

A remote monitoring system is provided including a sensor, for sensing data associated with a remotely monitored object; a transmitter coupled to the sensor, and for transmitting data of the sensor via satellite; and a notification system coupled to the transmitter, for receiving the sensor data and providing notifications to a user based upon the received sensor data.

20 Claims, 7 Drawing Sheets

(51) Int. Cl.
  *G08B 13/14* (2006.01)
  *G08B 21/20* (2006.01)
  *G08B 25/10* (2006.01)
  G08B 13/08 (2006.01)
  G08B 13/10 (2006.01)
  G01S 19/16 (2010.01)

(52) U.S. Cl.
  CPC .............. *G08B 25/10* (2013.01); *G01S 19/16* (2013.01); *G08B 13/08* (2013.01); *G08B 13/10* (2013.01)

(56) References Cited

U.S. PATENT DOCUMENTS

| | | |
|---|---|---|
| 7,512,488 B2 | 3/2009 | Humphrey |
| 7,937,215 B2 | 5/2011 | Humphrey |
| 7,937,216 B2 | 5/2011 | Humphrey |
| 8,150,615 B2 | 4/2012 | Humphrey |
| 8,340,909 B2 | 12/2012 | Humphrey |
| 8,504,294 B2 | 8/2013 | Humphrey |
| 8,798,913 B2 | 8/2014 | Humphrey |
| 9,672,728 B2 * | 6/2017 | Deluliis ................. G08B 29/14 |
| 9,691,266 B2 * | 6/2017 | Deluliis ................. G08B 29/14 |
| 2002/0021231 A1 * | 2/2002 | Schlager ............... B63C 9/0005 340/984 |
| 2003/0214398 A1 | 11/2003 | te Boekhorst et al. |
| 2006/0015543 A1 | 1/2006 | Humphrey |
| 2006/0102731 A1 * | 5/2006 | Mueller ................... F23N 5/203 236/51 |
| 2006/0243347 A1 | 11/2006 | Humphrey |
| 2008/0033668 A1 | 2/2008 | Humphrey |
| 2009/0021370 A1 * | 1/2009 | Fish ................... B60R 25/1003 340/539.13 |
| 2009/0248325 A1 | 10/2009 | Humphrey |
| 2010/0241277 A1 | 9/2010 | Humphrey |
| 2011/0173128 A1 | 7/2011 | Humphrey |
| 2011/0247705 A1 | 10/2011 | Humphrey |
| 2012/0316915 A1 | 12/2012 | Humphrey |
| 2013/0201316 A1 * | 8/2013 | Binder .................... H04L 67/12 348/77 |
| 2013/0275062 A1 | 10/2013 | Humphrey |
| 2015/0059468 A1 | 3/2015 | Humphrey |
| 2015/0096876 A1 * | 4/2015 | Mittleman ............. H01H 11/00 200/341 |

\* cited by examiner

REMOTE MONITORING SYSTEM

RELATED PATENT DATA

This application is a 35 U.S.C. § 371 of and claims priority to PCT International Application No. PCT/AU2015/050725 which was filed on 18 Nov. 2015, and was published in English, and claims priority to AU Patent Application No. 2014904629, which was filed on 18 Nov. 2014, the teachings of which are incorporated herein by reference.

TECHNICAL FIELD

The present invention relates to remote monitoring. In particular, although not exclusively, the invention relates to satellite based remote monitoring of agricultural infrastructure.

BACKGROUND ART

The regular monitoring and control of infrastructure in large properties is very costly. Watering points, such as troughs, tanks, dams and the like, are critical in the survival of livestock, however can be unreliable. As such, an unnoticed failure of a watering point can be devastating to livestock and extremely costly to a livestock owner. Similar problems exist on failure of other infrastructure, such as electric fences, gates and the like.

Traditionally, site visits or "bore runs" are performed to manually inspect watering points and other infrastructure. A schedule is generally set up where a person travels to each of the watering points, or other piece of infrastructure, periodically to inspect the infrastructure, and then performs repairs on the infrastructure as needed.

A problem with site visits of the prior art is that they are costly and time consuming. In particular, the cost of fuel, associated equipment and labour is often very high. As an illustrative example, many large cattle stations in Australia can be more than 100 km from boundary to boundary and as such infrastructure may be spread out over very large and difficult to access areas. Furthermore, there are significant safety issues associated with site visits, particularly when communication to and from the remote site is limited. As a result, a property owner may perform site visits less often, at a cost of having a higher risk being associated with failure of such infrastructure.

More recently, short range radio and cellular data systems have been used to remotely monitor infrastructure. In particular, data is transmitted from sensors of the infrastructure back to a central point where infrastructure can be monitored by a user.

A problem with short range radio and cellular data systems is that they are costly. In particular, the cost of installing appropriate antennas and repeaters is generally very high, particularly in remote and hilly (undulating) areas.

A further problem with short range radio systems of the prior art is that they are not suited to undulating areas where there is no line of sight between the infrastructure and the monitoring station. Similarly, a problem with cellular data systems is that cellular coverage is generally not available in remote areas. As such, before such systems are purchased, costly site surveys are generally required to determine if the systems are even suitable.

Yet a further problem with short range radio and cellular data systems of the prior art is that relocation of sensors and associated infrastructure, which can include radio towers, is costly and time consuming.

Yet a further problem with short range radio and cellular data systems of the prior art is that associated radio towers are subject to lightning strikes, which is disastrous to electronic sensor and modem hardware, and is thus costly and results in downtime of the system.

Accordingly, there is a need for an improved remote monitoring system.

It will be clearly understood that, if a prior art publication is referred to herein, this reference does not constitute an admission that the publication forms part of the common general knowledge in the art in Australia or in any other country.

SUMMARY OF INVENTION

The present invention is directed to a remote monitoring system, which may at least partially overcome at least one of the abovementioned disadvantages or provide the consumer with a useful or commercial choice.

With the foregoing in view, the present invention in one form, resides broadly in a remote monitoring system including:

a sensor, for sensing data associated with a remotely monitored object;

a transmitter coupled to the sensor, and for transmitting data of the sensor via satellite; and a notification system coupled to the transmitter, and for receiving the sensor data and providing notifications to a user based upon the received sensor data.

Advantageously, the system may be used to provide cost effective monitoring of remote objects, such as pumps and the like, in remote areas.

Preferably, the remotely monitored object comprises infrastructure. Suitably, the infrastructure comprises agricultural infrastructure. Alternatively, the remotely monitored object includes a person or an animal.

The system may include a plurality of sensors, for sensing data associated with a plurality of remotely monitored objects.

The system may include a plurality of transmitters coupled to the sensors. According to certain embodiments, at least two sensors are coupled to a transmitter of the plurality of transmitters.

The remotely monitored object may comprise at least one of troughs, tanks, dams, fences, gates, panic or safety buttons, power systems, irrigation systems, traps and electronic devices.

The sensor may comprise at least one of fluid level sensors, electric on-off sensors, magnetic open-closed sensors, animal trap counters, or flow rate sensors.

The transmitter may be configured to periodically transmit data of the sensor. Alternatively or additionally, the transmitter may be configured to send sensor data when one or more criteria are met. For example, the transmitter may be configured to send sensor data when the sensor data is outside of a predefined range, or is above or below a threshold. According to certain embodiments, a configuration of the transmitter is modified remotely by sending new configuration settings to the terminal. This may be performed with the purpose of increasing monitoring resolution and/or control over the remote object as needs change.

The transmitter may be configured to periodically transmit data at different rates based upon the sensor data. For example, when above or below a threshold, the data may be transmitted at a higher rate than otherwise.

The notification system may be configured to periodically provide notifications to the user. Alternatively or additionally, the notification system may provide notifications to the user when one or more criteria are met in relation to the sensor data. For example, the notification system may be configured to provide notifications to the user when the sensor data is outside of a predefined range, or is above or below a threshold, or at a predetermined time.

As such, the sensor data may be sent immediately or buffered, and may be compressed to reduce transmission costs.

The notification system may compare the sensor data to predefined patterns representing known problems of the object, or to historical sensor data of the object to detect an outlier in the data.

The transmitter may be wired directly or wirelessly (e.g. by a local 434 MHz RF link) coupled to the sensor(s).

The transmitter may further include cellular data (e.g. GSM, 3G, or 4G data) and/or wireless LAN communication capabilities. The transmitter may be configured to transmit data to the notification system 115 by a cellular data network or a wireless LAN network where possible and by satellite otherwise.

The transmitter may select among available data networks based upon a predefined selection criteria.

According to certain embodiments, a first user is associated with a first object and a second user is associated with a second object, and the notification system is configured to providing notifications to the first user based upon received sensor data of the first object, and notifications to the second user based upon received sensor data of the second object.

The system may further include a local sensor network comprising a set of the plurality of sensors, wherein sensor data is repeated in the local sensor network prior to being transmitted by the local transmitter. This may enable sensor data from a sensor outside of range of the local transmitter to send data using the local transmitter as the sensor data is repeated.

According to certain embodiment, the system further enables remote control of the remotely monitored object. For example, valves may be remotely opened and closed, and machinery may be turned on and off. As an illustrative example, users may be able to configure rules to provide automation. The rules may be predefined.

The system may further include a GPS module associated with the sensor, for providing location information associated with the remotely monitored object. The location may be displayed on a map of the graphical user interface.

According to certain embodiments, the system may be configured to generate report based upon sensor data.

The system may include a graphical user interface to enable the user to receive and interact with the received sensor data. The graphical user interface may include a map defining a region including the object.

The graphical user interface may include an icon corresponding to the object, and a point of interest indicator, identifying a point of interest in the region.

The icon may be selectable, enabling the user to obtain further information regarding the object. The further information may include a state of the object, a time associated with the state of the object, and object history information.

The graphical user interface may include a warning, indicating a potential problem with the object. The warning may be colour coded. Alternatively or additionally, a warning icon may be presented in association with the object.

The graphical user interface may enable the user to group objects, and selectively display graphical elements corresponding to groups of objects. The ability to group objects allows the user to interactively select layers of information.

The system may further enable the user to print map for generating directions or instructions to workers. For example, the direction may include direction for a helicopter pilot on a mustering mission, explaining which direction to move cattle and into which set of yards.

In another form, the present resides broadly in a kit for a remote monitoring including:

a plurality of sensors, for sensing data associated with remotely monitored objects; and a transmitter, for coupling to at least one of the sensors and for transmitting data of the at least one sensor via satellite to a notification system that is configured to provide notifications to a user based upon the received sensor data, wherein the transmitter is selectively coupleable to a first of the plurality of sensors for sensing first sensor data and to a second of the plurality of sensors for sensing second sensor data.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
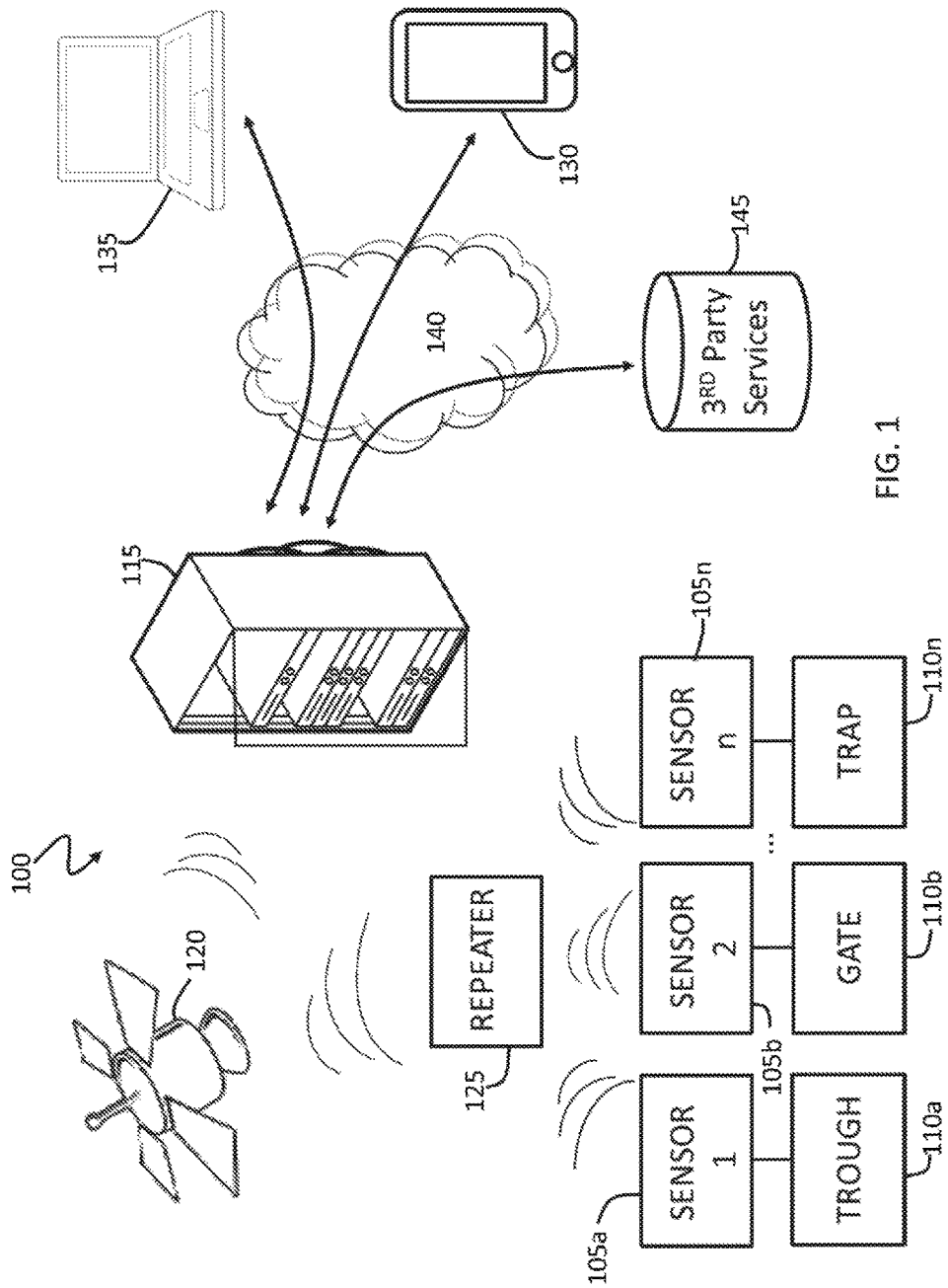
FIG. 1 illustrates a property management system according to an embodiment of the present invention.

FIG. 1 illustrates a property management system 100 according to an embodiment of the present invention. The system 100 is able to more efficiently monitor infrastructure on a property (or several properties), and thus better manage human resources and planning. For example, the system 100 may notify a user of a problem as it occurs, which enables appropriate action to be taken immediately.

The system 100 includes a plurality of sensors 105*a-n* monitoring a plurality of infrastructure elements 110*a-n*. Examples of infrastructure elements 110*a-n* include troughs, tanks, dams, fences, gates, panic or safety buttons, power systems, irrigation systems and traps. Examples of sensors 105a-n include fluid level sensors, electric on-off sensors and magnetic open-closed sensors.

The sensors 105a-n are coupled to a notification system 115 by a data satellite 120. In particular, the sensors 105a-n are able to transmit sensor readings to the satellite 120 by a local satellite transceiver (repeater) 125, and the sensor readings are in turn transmitted from the satellite 120 to the notification system 115.

The local satellite transceiver 125 may include, for example, a 9602 or 9603 Iridium Satellite transmitter or a Globalstar STX3 satellite transmitter.

The local satellite transceiver 125 may be configured to periodically transmit data of the sensors 105a-n, and/or transmit data of the sensors 105a-n when the data changes or is above or below a threshold. In a particular embodiment, the sensor data may be transmitted to the notification system 115 daily, as well as immediately upon certain changes in the sensor data or if requested by a user.

The sensors 105a-n may include a MODBUS enabled communications port. This enables interoperability between a wide variety of sensors and the system 100. Examples of sensors including MODBUS ports include multi-function power meters (including high voltage meters), programmable logic controllers (PLCs), smart meters, sensors and the like.

The notification system 115 may detect potential problems in the infrastructure elements 110a-n based upon the sensor data and transmit a warning to a mobile phone 130 of a user by SMS or email. The user may then log onto the notification system 115 using a personal computer 135 and view the sensor data.

The skilled addressee will readily appreciate that the notification system 115 and the mobile phone 130 or personal computer 135 are coupled to each other by a communications network 140, such as the Internet. This enables the mobile phone 130 or personal computer 135 to interact with the notification, from virtually any location, and without requiring a proprietary data network to be used.

The notification system 115 may detect potential problems in the infrastructure elements 110a-n by comparing the sensor data to predefined patterns representing known problems, or to historical sensor data to detect an outlier in the data. Alternatively, the user may pre-configure set points upon which alarm notifications are generated.

As an illustrative example, a pump to a trough may fail in a remote area of a property. A water level sensor may transmit level readings of the trough periodically (e.g. at least daily, twice a day, hourly or every 10 min) to the notification system 100 by satellite 120 as described above. The notification system 115 may detect, based upon the sensor data, that the trough is not filling up as it should, and thus issues a warning to the user by SMS that there may be a problem with the pump. The user may then log on to the notification system 115, and view the sensor data, for example historical sensor data associated with the trough.

Alternatively, a low level sensor may be associated with the trough. When the trough level goes below a certain level, an indication that the low level sensor has been activated may be immediately transmitted to the notification system and subsequently to the user.

As data is regularly transmitted to the notification system 115, and immediately as a problem is detected, the user is able to be notified of a problem almost as it occurs. As such, the problem may be fixed before it causes any follow on problems.

The notification system 115 may be pre-loaded with configuration data at the request of the user. This data may be transferred to the object in an exchange of every telemetry message. The command may then be processed by the object upon which a response is generated triggering another exchange. This process may then continue until there are not more commands to be processed from the notification system 115.

As illustrated in FIG. 1, the local satellite transceiver 125 is coupled to more than one sensor 105a-n. The local satellite transceiver 125 may be able to be coupled to a single sensor, to two sensors, three sensors, four sensors, ten sensors or more.

The local satellite transceiver 125 may be wired to the sensors 105a-n or wirelessly coupled to the sensors 105a-n.

According to certain embodiments, the sensors 105a-n are Plug and Play compatible with the local satellite transceiver 125. In particular, any sensor 105a-n may be coupled to any local satellite transceiver 125, and may be able to transmit data with little or no configuration. As such, a local satellite transceiver 125 can be simply repurposed by coupling a different type of sensor 105a-n to it.

Finally, as discussed below, the notification system 115 may be coupled to third party service providers 145, such as map providers to enable the sensor data to be overlaid onto a map as discussed below.

Figure 2:
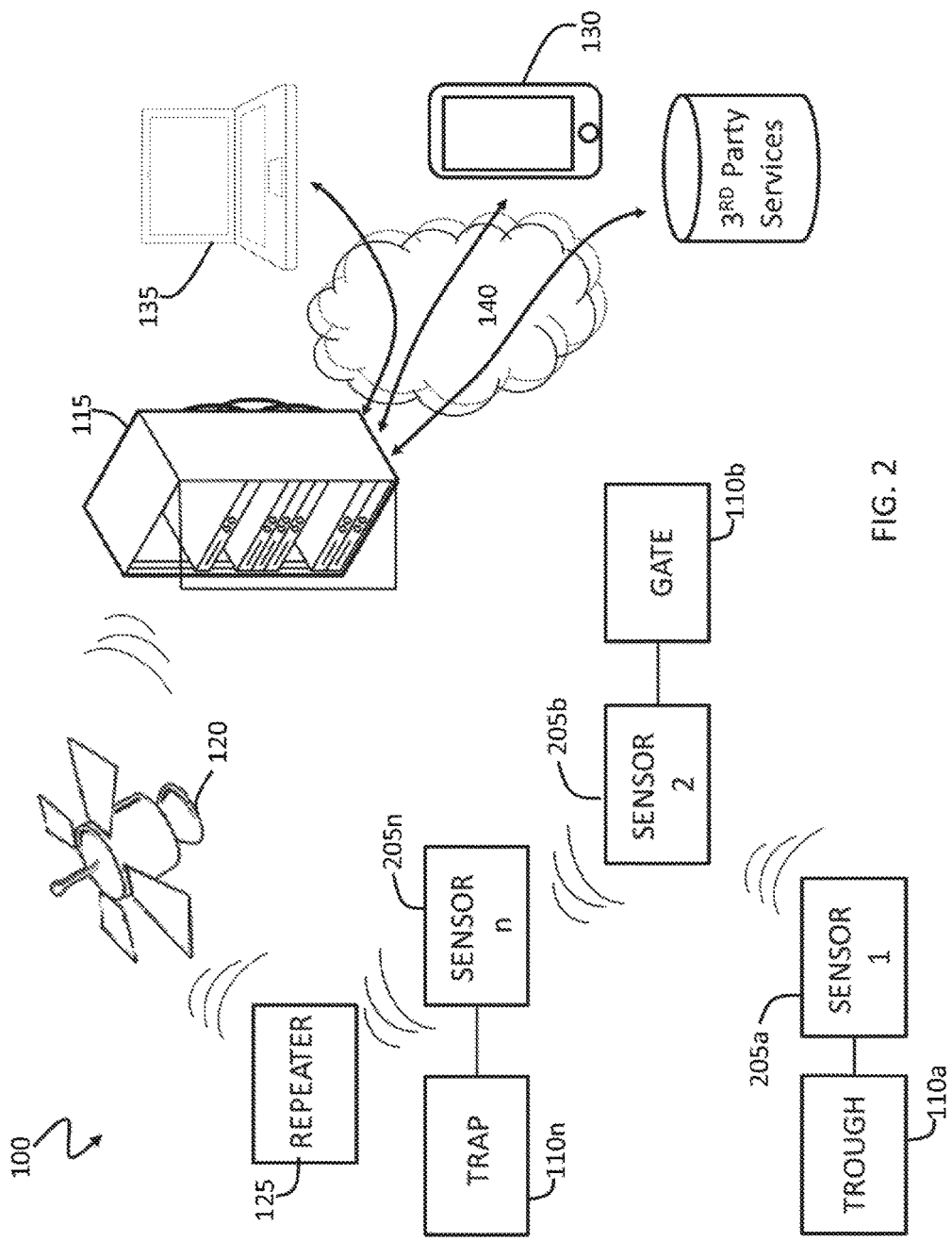
FIG. 2 illustrates a property management system according to an embodiment of the present invention.

FIG. 2 illustrates a property management system 200 according to an embodiment of the present invention. The system 200 is similar to the system 100, but utilises local sensor networks, as outlined below.

The system 200 includes a plurality of sensors 205a-n that are within a geographical region (e.g. within 35 km) of each other. Each sensor 205a-n broadcasts its own sensor data by low power radio. When a sensor 205a-n receives sensor data of another sensor 205a-n, it repeats it, for example once. As such, sensor data may travel along a path, from sensor 205a-n to sensor 205a-n, and finally reach the repeater 125. The sensor data may then be handled by the system 200 as outlined above, and warnings may for example be provided.

The system 200 enables extra sensors 205a-n to be added without requiring a further local satellite transceiver 125, even if the new sensor 205a-n is outside of the range of the local satellite transceiver 125.

According to certain embodiments, the local satellite transceiver 125 may comprise a transceiver including cellular data (e.g. GSM, 3G, or 4G data) and/or wireless LAN communication capabilities. As such, if the transceiver comes within range of a cellular data network or a wireless LAN network, the transceiver may choose to transmit data to the notification system 115 by the cellular data network or a wireless LAN network to reduce costs.

The transceiver 125 may be configured to select available data networks based upon predefined selection criteria, based upon signal strength, or by any other suitable selection criteria.

According to certain embodiments, the sensors 205a-n and/or the local satellite transceiver 125 may include a GPS module. As such, GPS coordinate data can be transmitted together with the sensor data to provide context to the sensor data. Such GPS coordinate data may be particularly important for portable infrastructure 110a-n and sensors 205a-n.

According to certain embodiments, different users may be associated with different infrastructure elements 110a-n/ sensors 205a-n. For example, a first user may be associated with all infrastructure in a first sub-region, and a second user may be associated with all infrastructure in a second sub-region. In such case, the notification system 115 may determine which user is associated with the received sensor data, such that the data is only transmitted to the associated user. The relationship between the users and the objects is generally "many-to-many", i.e. a single user can monitor multiple objects, and similarly a single object can be monitored and controlled by multiple authorised users.

Finally, system administrators have the ability to create users which are uniquely identified in the system by a username and password key pair. As such, access to the system can be restricted to authorised users as is well understood in the art. Furthermore, a single user may manage several properties using appropriate access control.

Figure 3:
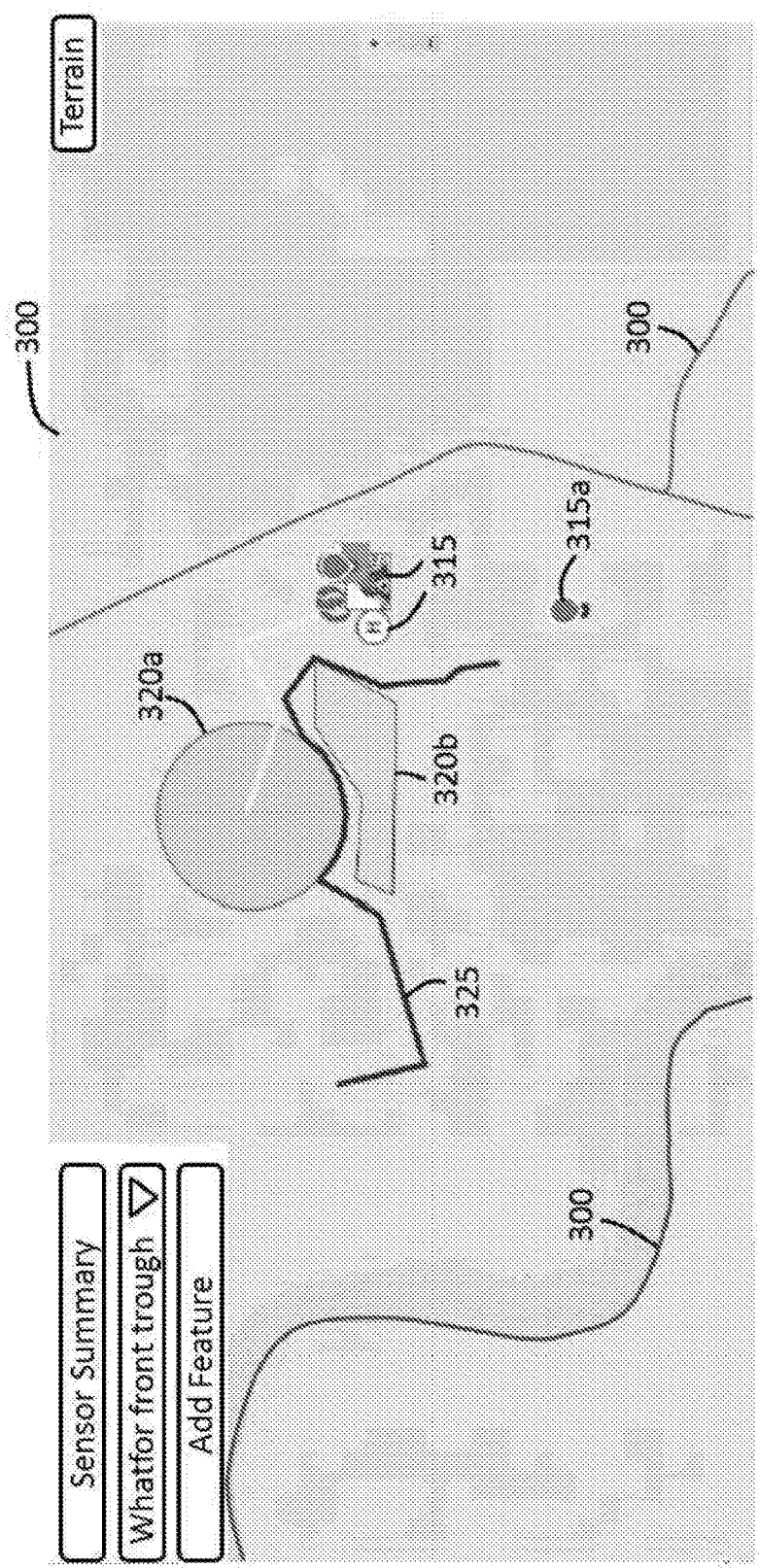
FIG. 3 illustrates a screenshot of an interactive map of a property management system, according to an embodiment of the present invention.

FIG. 3 illustrates a screenshot 300 of an interactive map, according to an embodiment of the present invention. The interactive map may form part of the system 100 or system 200 above, and is advantageously provided to the user on a web browser, such as Google Chrome or Internet Explorer, to provide maximum interoperability.

The interactive map enables the user to monitor or control a property from a portable computing device, such as a touchscreen tablet, in a convenient area such as an office, kitchen, or anywhere in the world the user may be. The interactive map enables the user to view sensor data, including current and historical sensor data, as well as view warnings and other notifications.

As discussed above, the system 100, 200 may interact with third party service providers 145, such as map providers. In particular, a map from a map provider may form the basis of the interactive map, and may include road elements 305 and nature elements 310, identifying roads and nature elements such as hills, rivers and the like on the interactive map.

According to certain embodiments, the map may include further map overlay data, such as Real Time Kinematic (RTK) GPS data contours, and agricultural data layers.

The interactive map also includes a plurality of icons 315, including icons representing infrastructure elements or points of interest. The interactive map also includes regions of interest, including circular regions 320a and polygonal regions 320b.

The circular regions 320a may be defined by a point location and a size, and may be useful to describe regions such as regions covered by centre pivot irrigation systems. The polygonal regions 320b may be used to define regions of any shape, such as a region defined by a property perimeter, a dam, a paddock or an erosion area.

The interactive map also includes a plurality of line elements 325, which can be used to describe paths, power lines water pipes and the like. The line elements 325 may be defined by a plurality of points.

Finally, the interactive map includes a plurality of interactive navigation elements (not shown), such as zoom elements, panning elements and the like. The interactive navigation elements enable a user to focus in on areas of importance, such as a potential problem area, or navigate between a plurality of areas at a level of detail that cannot be provided on a single screen.

The interactive map can be used to monitor sensors, such as sensors of watering points and storage tanks, viewing configurations of infrastructure elements and current status (e.g. alarms, cattle information such as numbers through a trap gate, weight or RFID information, or status of a gate), and a history of the sensor data.

The icons 315 can be used to describe the associated element or point of interest, or a status of the element or point of interest. For example, a shape of the icon 315 may indicate a type of the element or point of interest (e.g. dam, fence, homestead), and the colour of the icon 315 may indicate a status of the element or point of interest (e.g. green=OK, red=error).

Alternatively or additionally, separate icons 315 may be provided to represent warnings or other status messages associated with the element or point of interest. For example, an error icon may be presented in association with an icon 315, or the icon 315 may be replaced by an error icon in case of an error in the associated equipment.

When an icon 315 or a region of interest is selected, or when a mouse cursor is hovering over the icon or region of interest, an information box may be displayed, enabling the user to obtain information in relation to the icon or region of interest. Such information can include an area of paddock, what is planted, important dates, bore capacities, problems with bore, feral animal and dingo problems, feed % remaining, cattle stock rates, stock disturbance etc. As such, the user is able to keep an eye on a large number of aspects, both current and historical, that are associated with the property.

Furthermore, historical data may be provided upon selection of an icon 315, or by selecting historical data in a menu. The historical data may be provided in graph form, which enables the user to quickly perform statistical analysis on the data.

The interactive map may be configured to display a preconfigured message based upon the sensor data, e.g. "I'm OK" in relation to a worker if no SOS signal is received and the worker appears to be exhibiting normal behaviour. As such, data of the sensors (or transmitted text messages) may be translated into a human readable message for display on the interactive map.

The interactive map enables a user to enter infrastructure elements as new icons 315 from predefined elements such as tanks, troughs, yards, airstrips, fences, gates, pipelines, pumps, etc., or configure custom infrastructure overlays.

According to certain embodiments, the interactive map provides bidirectional communication with the sensors or remote human users. In particular, the interactive map may enable remote control of actuators, gensets, pumps, etc. associated with infrastructure. Furthermore, such remote control may be used to control intelligent remote systems, such as drones, or remote robotic spraying or ploughing equipment. Furthermore, the map can act as a mission control planner for UAV photographic bore runs, precision farming and contour mapping.

After interacting with the interactive map, the user may print a copy of the map (or section thereof) to provide directions or instructions to workers.

Elements of the interactive map can be assigned to one or more layers to provide a grouping of elements. This allows the customer to quickly view elements of the map based upon group or category. For example, a user may select to view all 'water features', which may include irrigation lines, dams, waterlogged areas and rivers that are associated with such layer. Layers are able to be turned on and off to provide the user with the ability to gain a clearer view of specific features of the map. Furthermore, a default map view may be customizable with reference to which layers are shown and at what scale.

As an illustrative example, layer 1 may be used for fencing property, boundary, paddocks, yards, gates, electric fences; layer 2 may be used for roads, tracks and airstrips; and layer 3 may be used for infrastructure including dams, tanks, bores, agricultural information, contours and the like.

The user is able to add groups to the interactive map, wherein each group is defined by a layer. Within each group the user will have the option to name the group of objects, e.g. "water", "roads", "power", and switch the group on or off when viewing the map to enable the user to focus on particular types of goods. As such, if the user is interested in water systems of the property, the interactive map need not be crowded with unrelated icons, such as power or road related icons.

Furthermore, certain layers may be turned on and off automatically based upon a zoom level. For example the user may create a group called "roads", but select to only view those features when the map is zoomed out. This is particularly advantageous where certain icons and areas are only of relevance at certain levels of zoom, such as property wide zoom levels.

In addition to the examples provided above, the interactive map may include icons relating to the following: homesteads; stockyards, gates and traps; wind mills; dams and tanks; waterholes; solar bores; diesel bores; generator bores; capped bores; troughs; pipelines; cattle grids; radio repeaters; hill tops; rain gauges (manual); weather stations (automatic); moisture sensors; roads; airstrips; helicopter fuel points; stock camps; swamp boundaries; danger spots; lick block drop points; satellite transceiver locations; helicopter pads; fuel points; creek crossings; outstations; loading ramps; electric fences; geo fences; virtual fences; agricultural information, contour maps, drainage lines, drone geo-course points; and drones.

Similarly, further examples of regions of interest include areas defined by boundary fences, internal fences, paddocks, electric fences; swamps; steel yards, portable yards, road areas and creek areas, contour erosion banks, watershed lines (ridge lines), areas defined by contours, dams, soil type zones, planted tree lots, native pastures, remnant vegetation, erosion areas, waterlogged areas and land capability classes.

According to certain embodiments, the regions of interest define geo fences. In particular, the system 100, 200 may be configured to provide a warning when an object, such as a piece of machinery, an animal or a person, leaves s region of interest, i.e. crosses a geo fence. As such, the system 100, 200 may provide surveillance of these objects.

Figure 4:
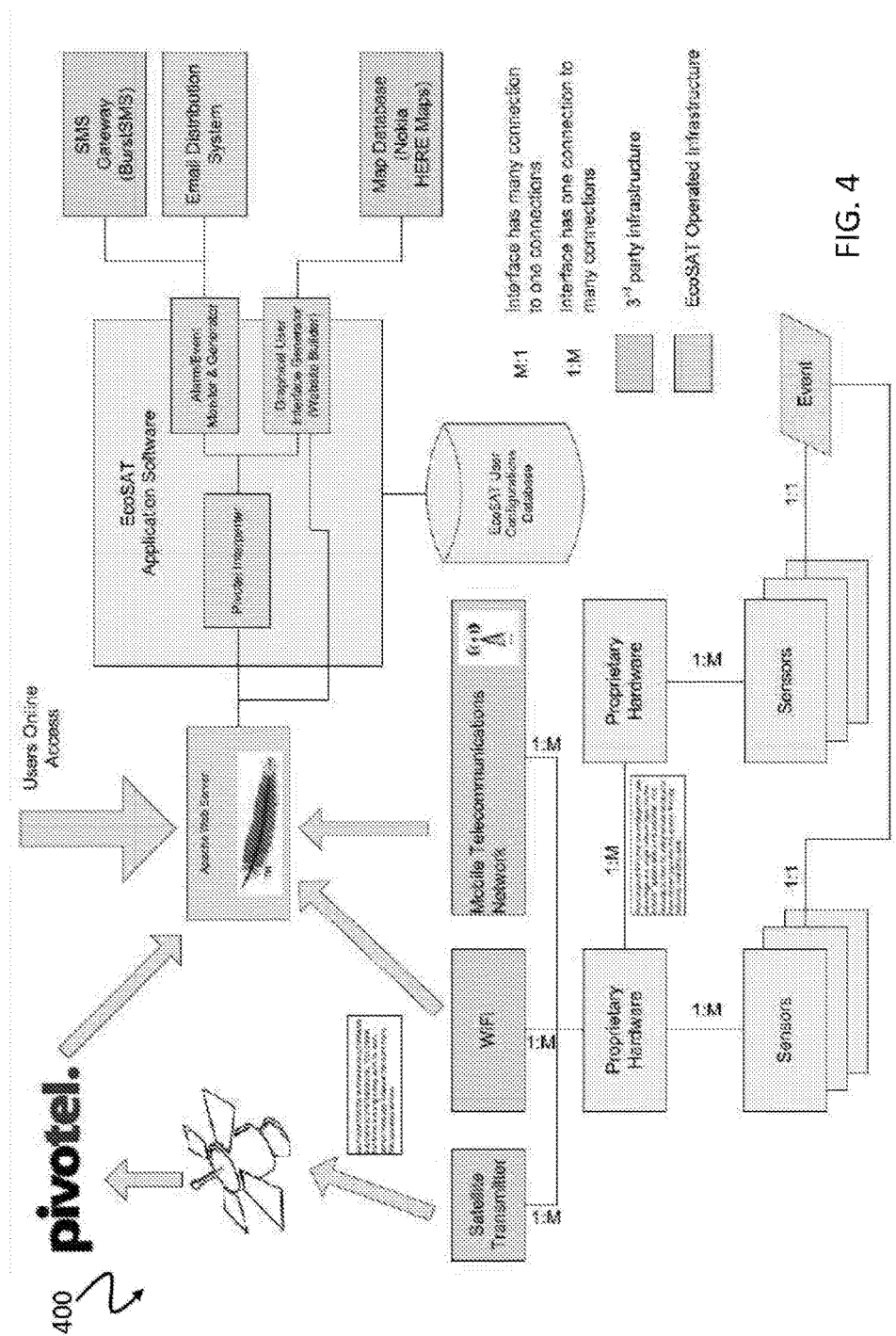
FIG. 4 illustrates a property management system according to an embodiment of the present invention.

FIG. 4 illustrates a property management system 400 according to an embodiment of the present invention. The property management system 400 is similar to the property management systems 100, 200 of FIG. 1 and FIG. 2.

In particular, events are detected by sensors which trigger the generation and transfer of a message from one terminal to either another terminal (in an attempt to find an exit connection) or directly to an exit connection (such as a satellite transceiver 125).

Messages are transferred over WiFi, 3G, or Satellite to the EcoSAT online system (such as the notification system 115) once they reach a terminal with an 'exit connection' available.

Once the message is received by the EcoSAT online system they are stored, billed, displayed and actioned in accordance with the configuration settings of the user(s) who have been assigned the owner of the device from which the message originated.

Message data is transferred to users by: a) displaying the information on the website; b) using a 3rd party provider to deliver notifications using an SMS message; and/or c) using 3rd party applications to deliver email notifications to the user.

Figure 5:
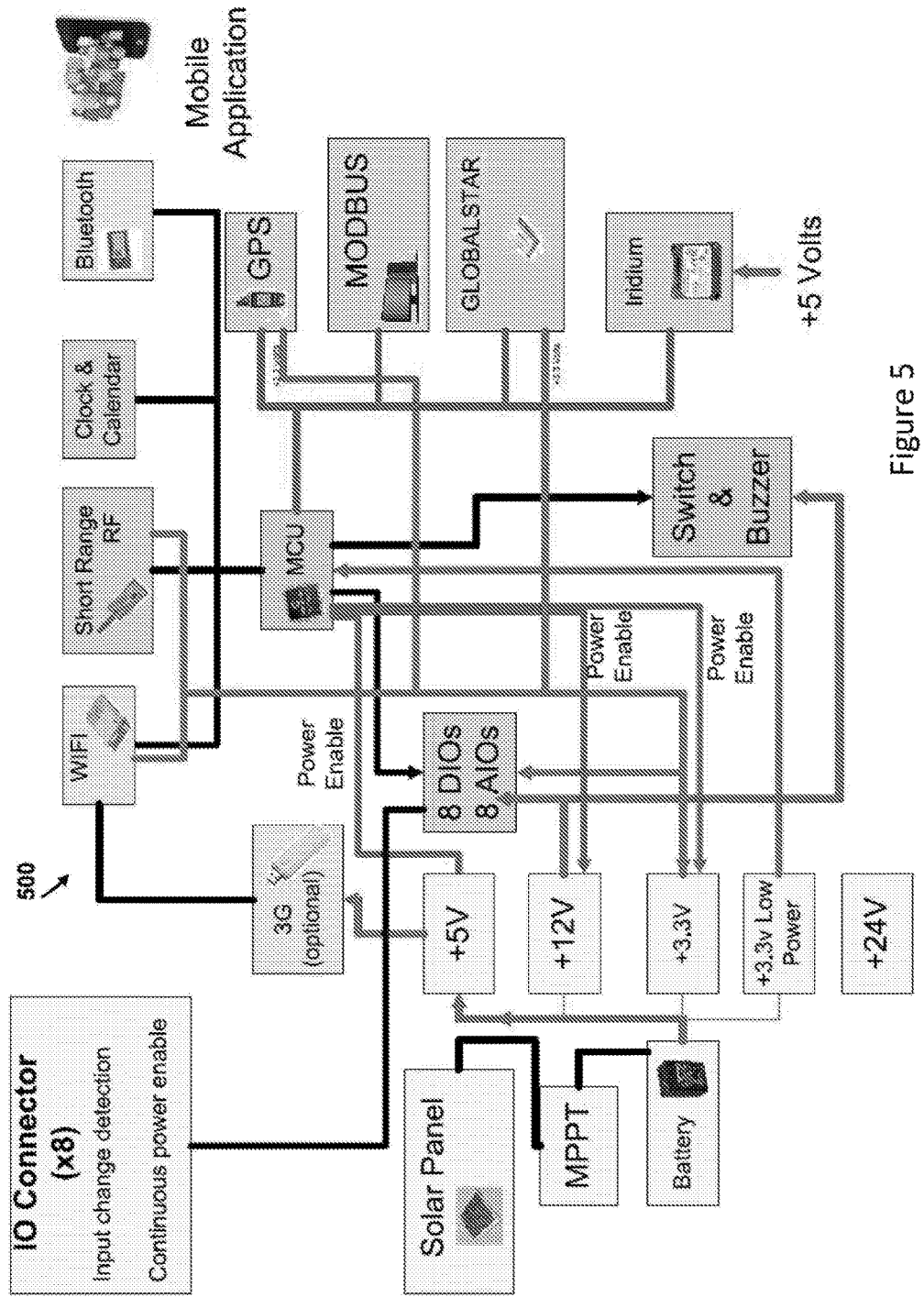
FIG. 5 illustrates a hardware layout of a portion of a property management system, according to an embodiment of the present invention.

FIG. 5 illustrates a hardware layout of a portion of a property management system 500, according to an embodiment of the present invention. The property management system 500 may be similar to the property management systems 100, 200 and 400 of FIGS. 1, 2 and 4 respectively.

The system 500 includes satellite communications provided by STX3 and 9602 or 9603 satellite transceivers. Point to point links between terminals that are within range of each other are provided by a Texas Instruments CC1100 System on chip 433 MHz transceiver, a Silicon Labs SI4463 System on chip 433 MHz transceiver, and a UAN433 MHz transceiver supplied by RF Modules China.

Local WiFi access is provided by the USB Dongle and a WiFi Connection Client is provided by a Microchip MRF24WB0MA/B.

A GPS Receiver, such as a u-blox GY-NEO6MV2, is coupled to the transceiver(s) for transmitting location data. This may be particularly advantageous if the transceivers/sensors are portable, or to distinguish between otherwise identical sensors/transceivers.

One or more batteries and associated solar panel(s) and charger(s) are provided for long life operation. In particular, the solar panel and charger charge that battery during daylight hours, which is then able to be used to run the system 500 continuously.

Power to the system supplied in four parts: a) two or more high current switch mode supplies are provided that are shut down until required, at which time they are enabled by an on board processor; b) a single low voltage, low quiescent current regulator that provides full time power to the processor only; c) a battery and solar panel charger, such as a maximum power point tracker (MPPT), optimized for long operational life; and d) a high voltage low current power supply for the operation of active sensors. This power output is connected to the front panel sensor interface to enable the operation of active (powered) sensors as required to reduce power consumption. The combination of these power supplies enables the system 500 to operate for long periods of time without charging.

Figure 6:
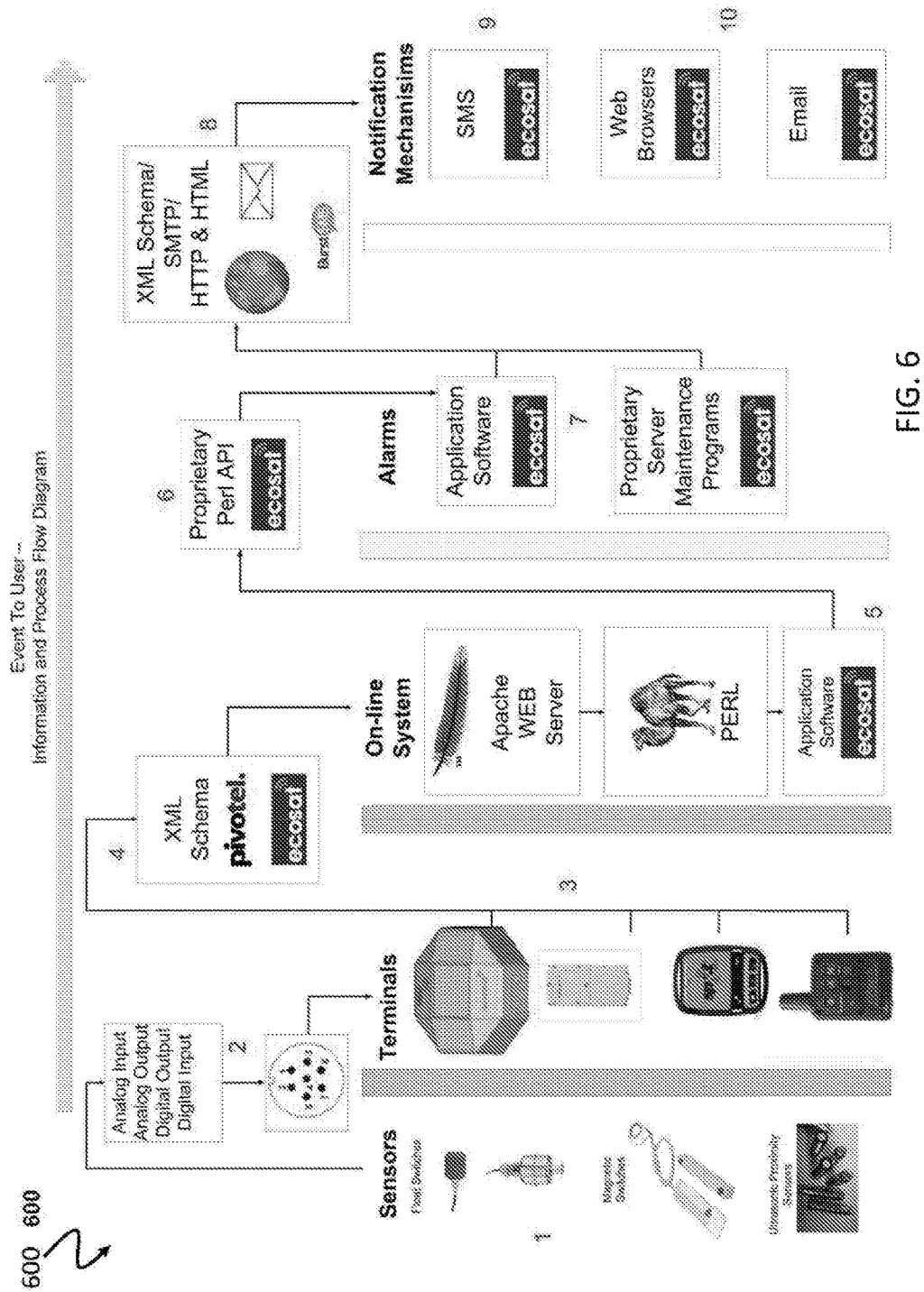
FIG. 6 illustrates an information flow diagram of a property management system, according to an embodiment of the present invention.

FIG. 6 illustrates an information flow diagram 600 of a property management system, according to an embodiment of the present invention. The information flow diagram 600 illustrates the flow of data as it goes from a single event, detected by a sensor, to information displayed to the user as either an online website, SMS or Email. The steps of the flow diagram 600 may be implemented by the system 100, 200, 400 or 500 of FIG. 1, 2, 4 or 5 respectively.

1) Sensors detect an event. As discussed above, a wide range of sensors can be used in relation to the present invention.

2) Each sensor includes a standard connector in the form of a multi-pin IP67 connector and an animal chew proof anaconda type insulated metallic sheathed conduit between the connector and sensor. Various sensors are provided with the same multi-pin IP67 connector enabling switching of sensors to suit individual requirements.

3) All terminals (i.e. satellite transceivers) have one or more matching/female multi-pin IP67 connector. All connectors conform to the same standard, each providing an analog output, analog input, digital input and digital output.

4) Message data from terminals are transferred into the EcoSAT system using an XML interface that is standardised across all terminals. The XML schema may, for example, be a Pivotel based schema that has been extended to include functions for terminals which bypass Pivotel, such as 3G and WiFi terminals.

5) The XML Message is transferred to the EcoSAT Online system over an Internet based HTTP connection. This connection is answered by an Apache web server and a 3rd party application which then calls the Perl (data bases) proprietary software to operate the EcoSAT online operations/functions.

6) Before data moves from the system, an acknowledgement is given to the sender. Then the data is stored in the system and a set of further operations on the data are made available through a predefined application programming interface (API). Furthermore ongoing monitoring and functions are continually executed on the data such as hardware monitoring such as silence alarms which are activated when no messages have been received for a pre-determined amount of time.

Figure 7:
FIG. 7 illustrates an screenshot of a graphical user interface of a property management system, according to an embodiment of the present invention.

7) Once the data has been verified it is then measured against a set of operating configurations as outlined by each user's settings. If appropriate, a notification will be actioned 8) Data is actioned through three interfaces: a) an XML schematic for communicating with 3rd party suppliers such as SMS gateway systems and Pivotel transmission services; b) email Notifications using the SMTP Open Source Clients; and c) HTML pages made available when requested by user HTTP requests using their own web browsers 9) and 10) data is sent to the user by SMS, email or through a browser FIG. 7 illustrates a screenshot 700 of a graphical user interface including an interactive map 705, according to an embodiment of the present invention. The graphical user interface may form part of the system 100 or system 200 above, and the interactive map 705 is similar to the map of FIG. 3.

The graphical user interface includes a layer selection menu 710, which enables the user to select one or more layers for display. Examples of layers include water, views, entry, fence, paddock, specific paddocks, boundaries and buildings. Upon selection (or deselection) of a layer, corresponding elements are added (or removed) from the map 705.

Each element of the map 705 is selectable, and upon selection of an element, a details pop-up menu is provided relating to that element. In the case of paddocks, the details pop-up menu may include details of an area of the paddock and a perimeter of the paddock.

Finally, the map 705 includes a viewpoint 720, from which a view element 720a extends. The view element provides a visual indication on the map corresponding to the view by the user from the viewpoint.

A number of exemplary scenarios in which the system 100, 200, 400, or 500 may be used are described below.

Electric Fence Monitoring

Standalone electric fence systems can be unreliable. In particular, during long overcast periods or when brush shields a solar panel of an electric fence system, a battery associated with the electric fence may go flat, and thus render the electric fence inoperable. Furthermore, brush may short the electric wire to ground.

Sensors 105a-n, 205a-n may measure a voltage of the battery (or otherwise an operation of the electric fence), and report sensor data to the notification system 115. When power to the fence is reduced or lost (e.g. voltage is below a threshold), a message may be sent to a user by the system 100, 200 to notify the user of the problem. The fence may then be repaired or herbage cleared before stock is able to escape.

Irrigation Monitoring

Lateral and rotary irrigators can become stuck or bogged during operation. As a result, part of a field may not be irrigated, while another part of the field is over irrigated.

Sensors may be used to track such irrigators, and generate an alarm when the irrigator deviates from a planned irrigation pattern. The sensors may also be used to determine the end of the run, i.e. legitimately finished irrigator rather than an illegitimately finished (e.g. bogged) irrigator.

Sensors may also be used to report on movement and volume of water pumped.

Animal Trap Monitoring

Animal traps may be placed in remote areas of a property to trap monitored species and problem animals, such as crocodiles, wild dogs and the like. It is desirable to attend to the trap as soon as possible after capturing an animal to ensure that no undue suffering is caused to the animal. Similarly, if the trap is accidently set off, it is desirable to reset the trap as soon as possible.

A magnetic sensor may be placed on parts of the trap to detect a state of the trap or gate. As such, an alarm can be triggered to the user when an animal is trapped in a trap.

Furthermore, a GPS sensor may be associated with the trap to detect movement in case a trap is stolen, or is moved by nature (e.g. storm surges in a waterway).

Personnel Tracking

Workplace health and safety is problematic in remote areas, particularly when staff are working alone. For example, a staff member working on a motorbike, quad, helicopter or horse in the duty of mustering, bore running or carrying out general maintenance may become involved in an accident in a remote area of the property.

Sensors may be used to track staff, and notify users of potential workplace health and safety risks. The sensors may also include an SOS function, or the ability to send pre-defined messages such as "I'm ok", "I'm not ok" or "I need help ASAP".

Advantageously, the sensor and transceiver 125 fits in a pocket or radio holster of the user, and as such, enables easy adoption of the technology by staff. The sensor and transceiver 125 may be used to transmit a duress notifying a previously nominated contact email address or number that an individual's status has changed.

As such, the systems 100, 200 can further assist in risk management by keeping track of station staff whilst in the field and especially for lone workers such as bore runners.

Vehicle Monitoring

Vehicles and machinery can be extremely valuable assets on a large property, and can include agricultural machinery, aircraft and the like. The system 100, 200 can monitor such equipment in a similar manner to the personnel tracking described above, and warn users when certain movement or unusual behaviour is detected. For example, a warning may be provided when a vehicle leaves an area defined by a geo-fence.

Sensors can be permanently fixed to the vehicle or machinery, and the location of the vehicle can be tracked even outside of the user's property, potentially nationwide.

Fire Management

The system 100, 200 may use fire drones to implement heat seek and smoke sensor technology to spot fire (hot spots) and send data to interactive map for layering. Furthermore, air and land based drones and automated farm equipment such as tractors and spray robots can follow user programmed, preconfigured geocourse points on a map for image taking, spotting or staff safety checks.

In case of an emergency, such as a bushfire, the interactive map can operate as a live bushfire assistance system, so that all personnel, vehicles and actual fire can be tracked on the map. The interactive map may also include integration of local weather data to show potential progression of for hot spots determined by land contours, fuel depots, bushland with programming recommendations for safer placement of fire fighting staff and volunteers. The interactive map may have the potential for bushfire risk colour data layering which can be purchased from existing information, or map owner can build their own property data.

Tracking of firefighters and firefighting assets will aid in their most efficient and safe placement, including the integration of the most current weather patterns, wind speeds, changes in direction, etc. The deployment of firefighting and data gathering drones will also help determine the most accurate temperature and wind speeds and aid in man down alerts. Many fire fighting situations can become chaotic with incorrect placement of people and equipment due to incorrect/poor information and communication. The complexity of multiple vehicles and firefighters, fences, locked gates, smoke, wind changes, confusion about water fill points or directions, impenetrable bush areas can all add to this chaos. The implementation of the Interactive Map will empower people with added relevant information, increase safety and maximise resources. Furthermore, radio instructions may be relayed to ground units to warn of potential dangers, directions etc.

Every person on the ground will be provided with a numbered and provisioned personal satellite tracker and directions could be given from the homestead/Smart Map location. In GSM areas, fire chiefs and select staff members will have access to the same data via smart tablet connected to the internet (where such service is available).

The system 100, 200 may be further configured to generate reports based upon the sensor data. The reports may identify utilisation of a particular item, error rates or the like.

The sensors are generally rugged and may include waterproof cable glands and steel conduits with waterproof connectors to ensure that weather, wildlife and stock cannot interfere with or damage the sensors. For example, connectors may be IP67 industrial bayonet connections and components may be covered in waterproof sheathing.

Specific examples of where the system 100, 200 can be used to assist cattle farmers include: Cattle weighing and NLIS RFID reporting; head/prize bull monitoring/tracking using a GPS sensor on a collar, unusual herd movement detection (which may indicate a predator or thief), cattle trapyard counters, intruder beam alerts, virtual fencing, late night access gate alerts, road traffic counters, electric fence fail alarms, soil moisture sensing, remote stopping/starting of equipment, generator/pump run or fail monitors, low fuel level alarms, various theft recovery devices, image capture (e.g. GSM only) and rollover sensors for vehicles.

While the present description primarily focuses on cattle and sheep producers in Australia, the present invention can be for other purposes and/or in other areas. The system may be used for safety and asset tracking, for example in the mining industry, the military, ranger stations and domestic monitoring.

Advantages of embodiments of the present invention include significant savings in energy, fuel, man hours, safety of personnel and a reduction of wear and tear on remote site machinery, which can in turn reduce costs associated with operation a property.

Furthermore, security of hardware and machinery may be provided, together with peace of mind in relation to staff safety, along with improved overall time management. To decrease risk to workers by reducing the need for onsite The utilisation of satellite technology enables rapid deployment of remote site sensors, including a very quick installation, low startup cost regardless of where the sensors are placed, as the system is not reliant on line of sight to a homestead or the like.

According to certain embodiments, an almost instant "over the counter" configuration/deployment can be provided where suitable sensors and transmitters are purchased and coupled to each other. As such, no specific training need be required to install a system according to certain embodiments of the present invention.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A remote monitoring system including:
   a sensor, for sensing data associated with a remotely monitored object; and
   a transmitter coupled to the sensor, and configured to transmit data of the sensor to a remote notification system via a data communications network of two or more data communications networks, at least one of which comprising a satellite data communications network;
   wherein the sensor is coupled to the transmitter by a standardized connector, the standardized connector configured to enable the sensor to be disconnected and replaced by a replacement sensor configured to sense different data, and thereby enable sensors to be replaced to suit different requirements;
   wherein the notification system is configured to receive the sensor data and provide notifications to a user based upon the received sensor data,
   wherein the transmitter is configured to select the data communications network from the two or more data communications networks to transmit data of the sensor to the remote notification system, the data communications network selected according to: an availability of each of the communications networks and predefined selection criteria, and
   wherein the remotely monitored object, the remote notification system and the user are each located at separate geographic locations.

2. The system of claim 1, wherein the remotely monitored object comprises infrastructure, a person and/or an animal.

3. The system of claim 1, further including a plurality of sensors, for sensing data associated with a plurality of remotely monitored objects.

4. The system of claim 3, further comprising a plurality of transmitters, wherein at least two sensors of the plurality of sensors are coupled to a transmitter of the plurality of transmitters.

5. The system of claim 1, wherein the remotely monitored object comprises at least one of troughs, tanks, dams, fences, gates, panic or safety buttons, power systems, irrigation systems, traps and electronic devices.

6. The system of claim 1, wherein the sensor comprises at least one of a fluid level sensor, an electric on-off sensor, a magnetic open-closed sensor, an animal trap counter, and a flow rate sensor.

7. The system of claim 1, wherein the transmitter is configured to periodically transmit data of the sensor.

8. The system of claim 7, wherein the transmitter is configured to periodically transmit data at different rates based upon the sensor data.

9. The system of claim 1, wherein the transmitter is configured to send sensor data when one or more criteria are met.

10. The system of claim 1, wherein the notification system is configured to periodically provide notifications to the user.

11. The system of claim 1, wherein the notification system is configured to provide notifications to the user when one or more criteria are met in relation to the sensor data.

12. The system of claim 1, wherein the notification system compares the sensor data to predefined patterns representing known problems of the object, or to historical sensor data of the object, to detect an outlier in the data, and issues notifications to the user based thereon.

13. The system of claim 1, wherein the transmitter further includes cellular data and/or wireless local area network (LAN) communication capabilities.

14. The system of claim 13, wherein the transmitter is configured to transmit data to the notification system by a cellular data network or a wireless LAN network where possible, and by satellite otherwise.

15. The system of claim 1, wherein a first user is associated with a first object and a second user is associated with a second object, and the notification system is configured to provide notifications to the first user based upon received sensor data of the first object, and notifications to the second user based upon received sensor data of the second object.

16. The system of claim 1, further including a local sensor network comprising a set of the plurality of sensors, wherein sensor data is repeated in the local sensor network prior to being transmitted by the local transmitter.

17. The system of claim 1, wherein the system is configured to enable remote control of the remotely monitored object by the user.

18. The system of claim 1, further including a GPS module associated with the sensor, wherein the data of the sensor is transmitted to the remote notification system with location information associated with the remotely monitored object.

19. The system of claim 18, wherein location information is displayed on a map of a graphical user interface.

20. The system of claim 1, further including one or more batteries and one or more associated solar panels, configured to charge the batteries, wherein the batteries are configured to power the sensor and the transmitter.

* * * * *